United States Patent

[11] 3,588,369

[72] Inventors David K. K. Lee
Chicago, Ill.;
Howard L. Wirsing, Wiesbaden, Germany

[21] Appl. No. 828,568
[22] Filed May 28, 1969
[45] Patented June 28, 1971
[73] Assignee GTE Automatic Electric Laboratories Incorporated
Northlake, Ill.

[54] PRECEDENCE TRUNK SELECTION IN A CENTRAL PROCESSOR CONTROLLED COMMUNICATION SWITCHING SYSTEM
20 Claims, 3 Drawing Figs.

[52] U.S. Cl. .......... 179/18D
[51] Int. Cl. .......... H04m 3/38
[50] Field of Search .......... 179/18 (D), 18 (ES)

[56] References Cited

UNITED STATES PATENTS 3,487,173 12/1969 Duthie et al. .......... 179/18(ES)
3,483,524 12/1969 De Buck et al. .......... 179/18(ES)
3,389,227 6/1968 Catterall et al. .......... 179/18(D)

FOREIGN PATENTS 1,277,371 9/1968 Germany .......... 179/18(D)

*Primary Examiner*—William C. Cooper
*Assistant Examiner*—Thomas W. Brown
*Attorneys*—Cyril A. Krenzer, K. Mullerheim and B. E. Franz

ABSTRACT: A translator and route selector of a central processor includes a common memory with a set of cores for each trunk to record its status as idle or busy at one of several possible levels of precedence. The route-selector includes a status circuit with a flip-flop for each possible level of precedence. During a first scan each flip-flop is set if a trunk is found at the corresponding status, and if an idle trunk is found it is selected. If none is selected a preempt control flip-flop is set, and the scan is repeated to select a trunk at the lowest level recorded by the status circuit.

INVENTORS
DAVID K.K. LEE
HOWARD L. WIRSING
BY Bernard E. Franz
ATTORNEY

PRECEDENCE TRUNK SELECTION IN A CENTRAL PROCESSOR CONTROLLED COMMUNICATION SWITCHING SYSTEM

CROSS REFERENCES TO RELATED APPLICATIONS

Essential matter for this invention is found in a copending U.S. Pat. application by D. K. K. Lee and D. N. Wong for Traffic Control in a Network of Switching Centers, Ser. No. 795,285 filed Jan. 30, 1969, now Pat. No. 3,560,663, issued Feb. 2, 1971, hereinafter referred to as said Traffic Control application; and also in an application by H. L. Wirsing for a Trunk Preference Circuit for a Communication Switching System, Ser. No. 749,131 filed July 31, 1968, now Pat. No. 3,532,830 hereinafter referred to as said Trunk Scanner application.

The above-mentioned applications relate to the Communication Switching System described in U.S. Pat. No. 3,328,534 by R. J. Murphy et al., hereinafter referred to as the System patent. The switching network marker for this system is described in U.S. Pat. No. 3,413,421 by A. S. Cochran et al. for Apparatus to Select and Identify One of a Possible Plurality of Terminals Calling for Service in a Communication Switching System, hereinafter referred to as the Identifier patent.

Three copending U.S. applications for a Digital Control and Memory Arrangement, Ser. No. 667,170 by H. L. Wirsing and W. C. Miller, filed Sept. 12, 1967, now Pat. No. 3,533,073; Ser. No. 690,356 by G. P. Minarcik filed Dec. 13, 1967, now Pat. No. 3,533,080 and Ser. No. 690,348 by D. K. K. Lee, J. R. Vande Wege and W. R. Wedmore, filed Dec. 13, 1967, now Pat. No. 3,533,079 hereinafter referred to as the Memory Sharing patent applications, disclose an arrangement of the common control equipment into three subsystems sharing a common memory.

A copending U.S. application for a Communication System Trunk Circuit, by L. L. Smith et al., Ser. No. 670,032, filed Sept. 25, 1967, now U.S. Pat. No. 3,524,934 hereinafter referred to as said Precedence Trunk Circuit, discloses a trunk circuit equipped to respond to a preempt signal from the marker to cause a distinctive signal to be sent to the parties engaged in a call, and then to drop the connection to permit establishing the priority call.

The type of logic conventions, and a description of the building block circuits including the flip-flops, is described in U.S. Pat. No. 3,293,368 by W. R. Wedmore for a Marker for a Communication Switching Network, and in particular a schematic drawing is shown in FIG. 51, described in columns 23, 24, 48 and 49; referred to hereinafter as said Building Block Description. Note that the marker unit described in that patent is used in an earlier switching system.

BACKGROUND OF THE INVENTION

1. Field of the Invention

This invention relates to automatic switching systems and particularly to providing multilevel preference or precedence and multilevel preemption of communication paths in such switching systems.

2. Description of the Prior Art

In a prior system including preference and preemption, a regular or normal trunk appearance and a second or auxiliary trunk appearance are provided for each of the outgoing trunk circuits. The system is further arranged so that the marker will hunt over the regular trunk appearances first and if any is found idle a call will be established to this trunk appearance. The trunk is then marked with the preference of the call. However, if all of the trunks appear busy when searched over the regular trunk appearance, the marker then hunts over the auxiliary trunk appearances. If any auxiliary trunk appearance is found in which a corresponding trunk is not engaged in the transmission of a preference call, it will be preempted, i.e., seized and the connection previously established over such trunk or transmission circuit interrupted and the new call having a higher precedence or preference level established over this facility.

If one attempts to extend such an arrangement and provide an additional trunk appearance for each level of preference or precedence, the amount of switching equipment must be greatly expanded because a small number of trunks require a large capacity.

It is desirable to incorporate multilevel preference and preemption in an electronic switching system of the type having a central processor operating with a common memory, in which the status of each trunk circuit is stored in the memory, and the route selector in the central processor searches through the memory to find an available trunk. If each trunk circuit is provided with an additional appearance for each level of precedence, then a separate set of memory elements would be required for each appearance, which further increases the cost of the system.

SUMMARY OF THE INVENTION

It is an object of out invention to provide a large plurality of preference levels and levels of preemption for transmission paths in a switching system from a single appearance of such a trunk or transmission path on the switching network.

According to the invention, a status circuit is provided which may be controlled by storage equipment individual to each of the trunks of the selected group of trunks, with the arrangement for selecting an individual one of the trunks being arranged for joint control by the status circuit and the storage equipment. More specifically, the precedence level indicated by the status circuit is the lowest level of preference of calls in progress over the trunks of the group.

In an embodiment of the invention incorporated in a switching system having a central processor and a common memory, a set of memory elements is provided for each trunk circuit in which the status of the circuit as idle or busy at some level of precedence is stored. The status circuit comprises a set of flip-flops, one for each level of preference, each of which is set if any trunk is found in use at the corresponding precedence level, during a first search in which an idle trunk is selected if it is found available. If no idle trunk is found, a preemption process is initiated to make another search to select an available trunk at the lowest level of precedence.

Figures 1A, 2A:
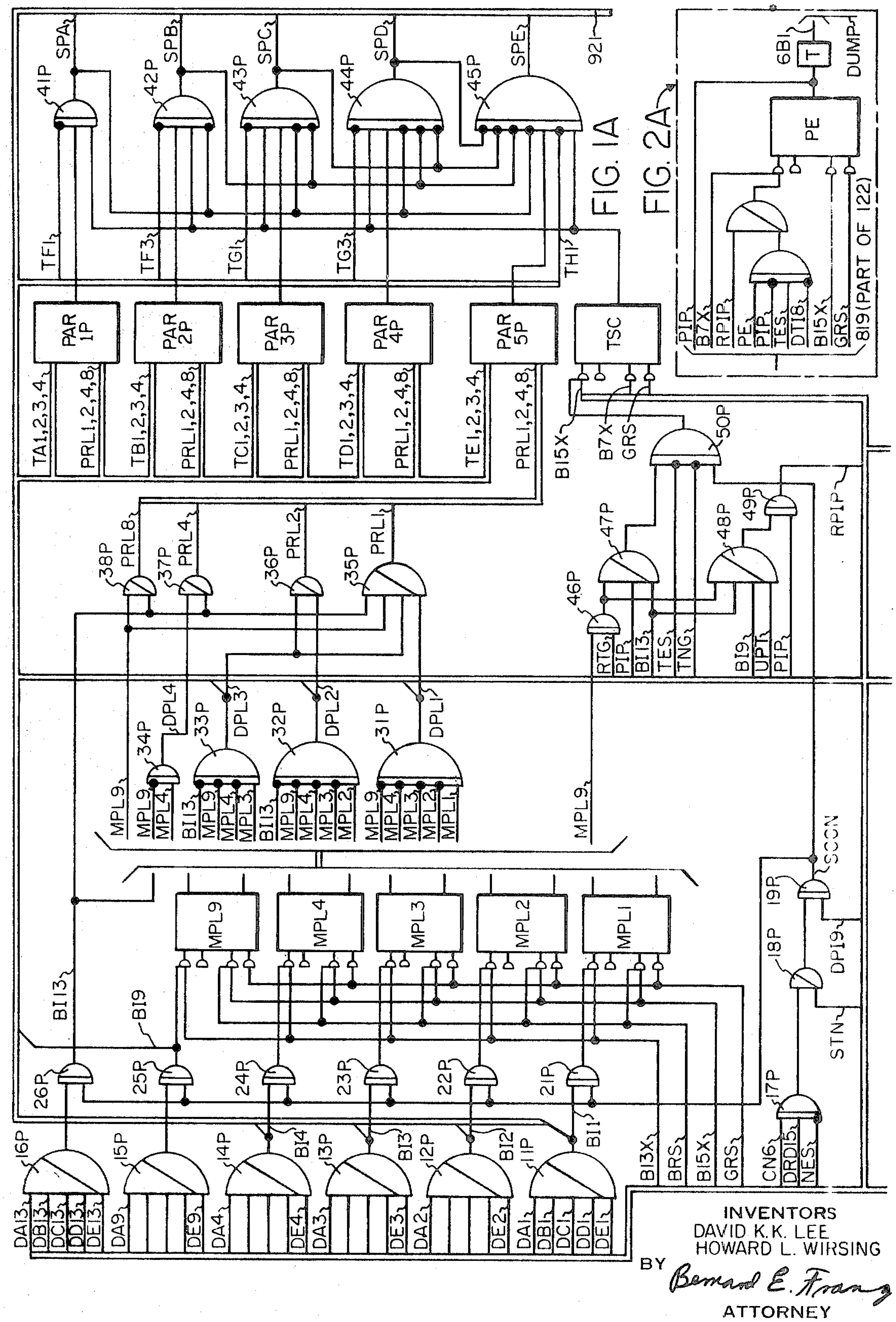
FIGS. 1A and 1B, with FIG. 1A placed above FIG. 1B comprise a functional block diagram of the route selection control circuits of the system disclosed in said system patent.
FIG. 2A is a functional block diagram of the preemption portion of the transfer buffer of the system.

In addition the following description makes reference to the FIGS. 1—13 of said Traffic Control application, using the reference characters and figure numbers thereof without specific reference to the application.

The description also refers to FIG. 9 of said Trunk Scanner application, which is referred to as FIG. TS9, and the reference characters of that FIG. are prefixed by TS.

DESCRIPTION OF THE PREFERRED EMBODIMENT

Figure 1B:
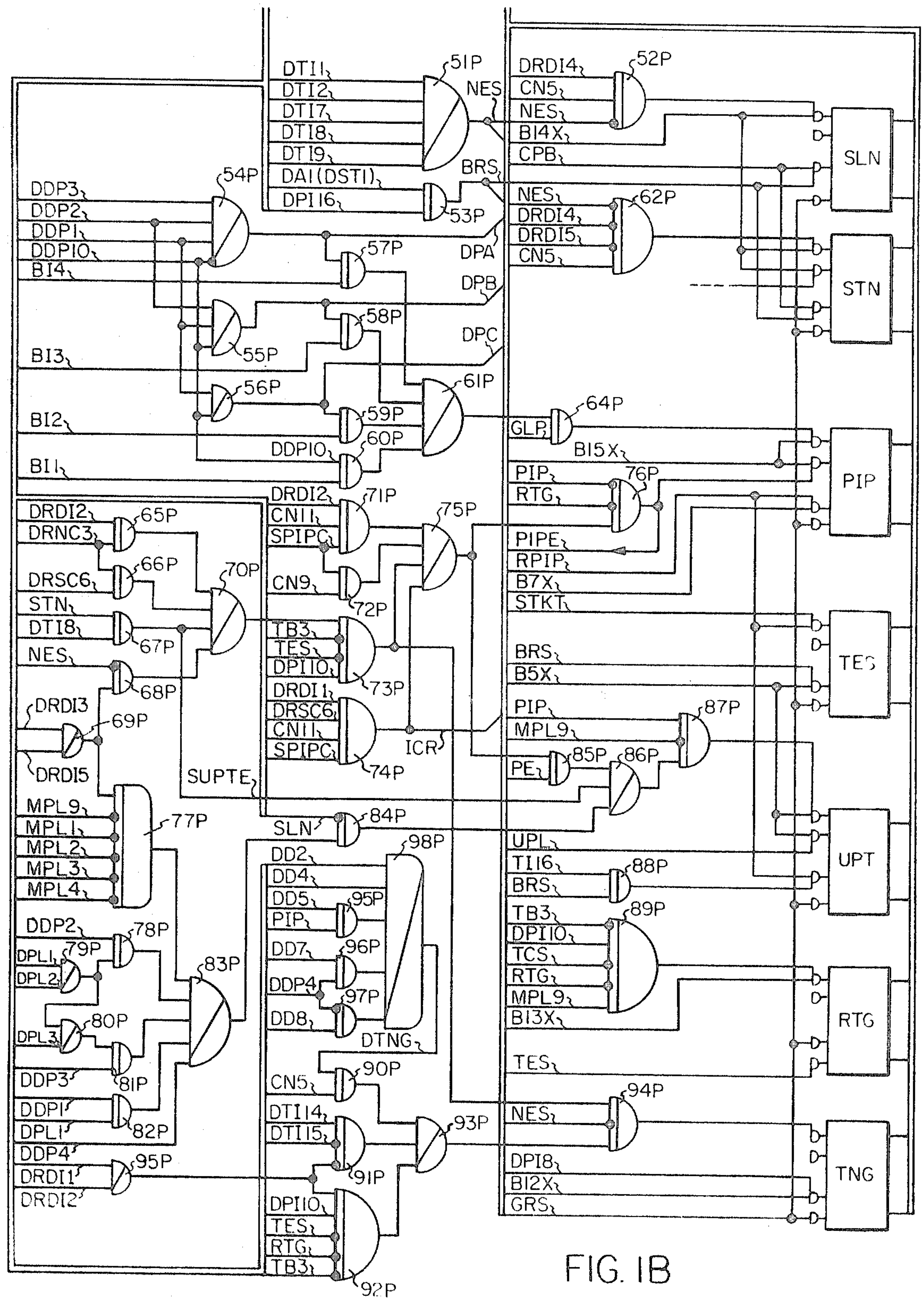

FIG. 9 of said Traffic Control application is a block diagram of the translator and route selector of the switching system in which the invention is embodied. FIGS. 1A and 1B herein comprise a functional block diagram of the route selection control circuit 911. FIG. 1A shows status and trunk selection circuits, while FIG. 1B shows control flip-flops and associated logic circuits for route selection control.

The principal portion of the status circuit comprises five flip-flops MPL1, MPL2, MPL3, MPL4 and MPL9, which operate in conjunction with the associated logic circuits and five comparator type parity circuits 1P—5P. A flip-flop TSC is for trunk selection control to enable the five AND gates 41P—45P. The outputs of the parity circuits 1P—5P are also connected respectively to the inputs of the gates 41P—45P to indicate available trunks, and the gates are interconnected so that only one of them may have a true output signal at a time, to thereby designate the trunk selected on one of the five leads SPA—SPE.

Referring to FIG. 1B, the flip-flop SLN (select line next) is set if the results of the translation of the dialed digits indicates that a specific line is to be selected, while the flip-flop STN (select trunk next) is set if a search is to be made of one or more groups of trunks to select one available for the call. When an available line or trunk is found the flip-flop TES (terminating equipment selected) is set. If an available trunk is not found on the first search, the flip-flop PIP (preempt in process) is set to initiate a preemption search. If for any reason there is no trunk available for preemption the flip-flop UPT (unable to preempt) is set. During the search operation one of the two flip-flops RTG (reenter this trunk group) or TNG (try next group) may be set to control the order in which the trunks are searched.

The flip-flops of the group selection control circuit 911, as well as a number of other signal conductors having their source therein, are listed in Table I for reference, A number of flip-flops and other signal conductors having their source in other circuits of the translator and route selector 120 or the transfer buffer 121, which are connected as inputs to the logic gates herein, are listed in Table II, with their source indicated with reference to FIGS. 8 and 9, or FIG. 3.

TABLE I

| Signals | Description |
|---|---|
| BI1, 2, 3, 4, 9, 13 | Busy-idle value found in at least one of five trunks of one word of status section. |
| BRS | Beginning reset of certain flip-flops when starting at beginning of section 1 in translation process. |
| DPL1, 2, 3, 4 | Decoded value of lowest precedence found during scan. |
| ICR | Inhibit counter reset. |
| MPL1, 2, 3, 4, 9 | Precedence value was found. |
| NES | Not equipment selection translation. |
| PIP | Preempt in process flip-flop. |
| PIPE | Signal to set preempt, used to reset route selection counters. |
| PR1, 2, 4, 8 | Binary-coded decimal value of DPL1, 2, 3, 4; MPL9, or BI13. |
| RPIP | Reset PIP. |
| RTG | Reenter this trunk group. |
| SCGN | Scanning a group for trunk selection. |
| SLN | Select line next flip-flop. |
| SPA, B, C, D, E | Selected trunk is from identified one of positions A–E of a DP19 word. |
| STN | Select trunk next flip-flop. |
| TSC | Trunk selection control flip-flop. |
| TES | Terminating equipment selected indicating flip-flop. |
| TNG | Try next trunk group flip-flop. |
| UPT | Unable to preempt. |

TABLE II

| Signals | Source | Description |
|---|---|---|
| B0X-B15X | 500 | Timing—CPB in TX intervals 0–15. |
| CN1-11 | 905 (FIG. 10) | Coincidence found type. |
| CPB | 500 | Clock pulse. |
| DA1-DJ15 | 620 (Decoded) | Decoded memory output digits. |
| DDP1-10 | 811 | Decoded dialed priority digits. |
| DPI1-25 | 908 | Decoded process instructions. |
| DRI1-5 | 817 | Decoded route digit indicator. |
| DRNC1-3 | 817 | Decoded route number. |
| DRSC1-6 | 817 | Decoded route sequence. |
| DTI1-31 | 803 | Decoded translation instructions. |
| GLP | 121 | General line preempt command. |
| GRS | 906 | General reset pulse. |
| PE | 122 | Preempt flip-flop of transfer buffer. |
| SPIPC | 817 | Set preempt in process. |
| STKT | 121 | Command to set trunk 10 flip-flops (816) upon terminating equipment selection. |
| TA1-TJ4 | 620 | Memory output bits from translator read buffer 620. |
| UPL | 121 | Unable to preempt line. |

While the signals listed in Table II are described in said Traffic Control and Trunk Scanner application, a brief review of some of them may be in order. The memory is word organized with 40 information bits per word organized as 10 positions A—J, each of which comprises bits designated 1—4. For the translator and route selector the words are read one at a time in successive operation cycles into the translator read buffer 620, the outputs of which are designated TA1—TJ4. For example, position A comprises bits TA1, TA2, TA3 and TA4, which may be abbreviated TA1,2,3,4 or TA1—4. The four bits of each position may be decoded as 16 signals, with decoded position A, for example, being one of the 16 possible signals DAO—DA15.

The clock pulse and timing signals are best explained in said Memory Sharing applications. Briefly the basic clock pulses comprise trains of pulses on two conductors designated CPA and CPB, with each train comprising 1-microsecond pulses recurring at 10 microsecond intervals, with each pulse of each train occurring 5 microseconds after a pulse of the other train. And the operation cycle counter designated the TX generator is a 16-stage counter which is stepped once by each pulse from the train CPA to provide in succession the 10 microsecond interval signals TXO—TX15. For the translator and route selector a word is read from memory once per operation cycle and appears in the translator read buffer in the interval TX11, remaining there until cleared in the interval TX7 of the next cycle, the word being rewritten into memory in the interval TX6. Thus, processing for each word may begin in the interval TX12.

For associative searches of the memory the coincident gating control circuits 905, shown in FIG. 10, are used to compare given digits stored in the transfer buffer with the digits in certain positions of successive words of the memory, with one of the coincidence signals CN1—CN11 being generated according to the type of word being searched.

Each word of the translator and route selector portion of the memory has a processing digit stored in the 5 bits I4—J4, which is decoded by the decode process instruction circuits 908 as one of the signals DPI1—DPI25.

The dialed digits for a call may include a priority digit DP and a routing digit DR which are stored in the buffer circuits 811, and addressing digits of which D1—D7 are stored in buffers 812, 813 and 814. The priority digits may be decoded as DDP10 for "flash override," DDP1 for "flash," DDP2 for "immediate," DDP3 for "priority," and DDP4 for "routine."

The translation section of the memory contains a plurality of words giving the translation information for particular codes. This information includes route selection information which is read from the appropriate word and stored in the buffer 817. It includes a route digit indicator having values DRDI1—DRDI5 indicating respectively whether a route sequence, a route number, a trunk group number, an individual line number, or a group number plus a trunk tens number to designate up to 10 lines for a PABX line search. The route sequence number designates one or two words in memory containing up to six route numbers, a route number designates a word of memory containing up to three trunk group numbers, and a trunk group number designates a section of memory containing the status of all of the trunks of a group.

In the route sequence and route number sections of the memory an unused route number or trunk group position has a value 15—15 stored for the tens and units digits, so that reading such a value indicates that the end of the sequence or the end of the route number has been reached. This is indicated in the route selection information buffer 817 by generating a signal SPIPC, which is supplied to the route selection control circuit 911. The storage equipment individual to each of the trunks of the several groups of trunks is found in section 7 of the memory (FIG. 7), the trunk and line status section. For each group of trunks there is a trunk group word having a process instruction of DPI8, a plurality of status words having a process instruction of DPI10, and two address words having process instructions of DPI11 and DPI18 for supplying addresses to the address generator to control proceeding to the next operation in the sequence. The DPI8 group identification words have the group tens and units numbers in positions A and B, and a group status digit in position D.

The DPI9 trunk status words each store the status of five trunks of a group. Positions A—E store busy-idle indicators for the five trunks respectively, bits F1—H2 store preseize and originating busy bits for the five trunks, bit H3 has a value of one for the first word having the first five trunks for a given trunk tens number, and a zero for the second work having the last five trunks thereof, bits H4—I4 store the trunk tens number, and bits H4—J4 are the process instruction DP19.

The busy-idle indicator in each of the positions A—E has decoded values designated DBI1—DBI15 with the values indicating the status as follows: 1-flash, 2-immediate, 3-priority, 4-routine, 9-queueing idle, 10-flash override, 11-equipment not in service, 13-true idle, 14-maintenance busy, and 15-not equipped.

In FIG. 1A, the OR gates 11P—16P each receive the decoded outputs of the busy-idle indicator for all five trunks of a word for one value thereof. The outputs of these gates are supplied respectively to AND-gates 21P—26P, which are enabled by a signal SCGN during a trunk search. The signal SCGN is supplied in response to coincidence of the signals STN and DPI9 via gates 18P and 19P. Gate 17P supplies a true signal during a PABX-type search as indicated by the signal DRDI5 when in the designated word as indicated by the signal CH6 which in coincidence with the signal DPI9 at gate 19P also can generate the signal SCGN.

The MPL flip-flops record the various levels of priority found in the busy-idle indicators during a trunk search. Thus, while reading one of the status words with the signal SCGN being true, if any one of the five trunks is busy at "flash" precedence as indicated by one or more of the signals DA1—DE1 being true the output of gate 11P via 21P supplies a DC set signal to the input of flip-flop MPL1, if one of them is busy at "immediate" precedence level the signal B12 from the output of gate 12P is supplied via gate 22P to a DC input of flip-flop MPL2, if any of them is busy at "priority" precedence level the signal B13 from the output of gate 13P via gate 23P supplies a DC signal to flip-flop MPL3, if any of them is "routine" busy the signal BI4 from gate 14P via gate 24P supplies the DC signal to flip-flop MPL4, and if any of them is "queueing idle" the output of gate 15P via gate 25P supplies a DC signal B19 to the input of gate MPL9. If any of the five trunks is "true idle" the output of gate 16P via gate 26P supplies the signal BI13.

The flip-flops MPL1—MPL9 which have received a DC input are set in response to the pulse signal B13X (clock pulse B during interval TX13. Once any one of these flip-flops has been set it remains set during the search of the remaining words of the group, and during each word additional flip-flops may be set in accordance with the status found. They will also remain set during the search of successive groups in a search involving alternate routes. Thus at the end of the search of all of the trunk groups available for a routing, the MPL flip-flops indicate each status level which has been found throughout the search.

If a trunk is found with a "true idle" status BI13 it is immediately selected. However, if no "true idle" trunk is found in the complete search it is desirable to determine what was the lowest level of precedence that was found. The AND-gates 31P—34P decode the outputs of the MPL flip-flops to determine this level. The lowest level which may be indicated is "queueing idle" with flip-flop MPL9 set to supply a signal on lead MPL9. The next lowest level is "routine" with flip-flop MPL4 set, which via gate 34P supplies a signal DPL4, in response to the signal on lead MPL4 being true and that on MPL9 being false. The next lowest level is "priority" indicated by flip-flop MPL3 being set and none of the lower priorities being true, which via gate 33P supplies a signal DPL3. The next lowest level is "immediate" which is indicated by flip-flop MPL2 being set and none of the lower priorities being true, which via gate 32P supplies a signal DPL2. The next lowest level is "flash" as indicated by flip-flop MPL1 being true and none of the lower priorities being true, which via gate 31P supplies a signal DPL1. The signal on one of the leads DPL1—DPL4, MPL9 or BI13 is encoded into binary coded decimal form by the OR-gates 35P—38P onto the leads PRL1, PRL2, PRL4 and PRL8. These four leads are connected as one set of inputs to each of the comparison parity circuits 1P—5P. The other set of inputs to the parity circuits are the busy-indicator values for the five trunks of a word respectively from the translator read buffer 620. For example parity gate 1P has one set of inputs with signals TA1,2,3,4 from position A, which is the binary-coded-decimal value of the busy-idle indicator for the first trunk in the word; and a second set of inputs comprising the signals PRL1,2,4,8 indicating the lowest level of priority found in a search. If these inputs are equal bit for bit the output of the parity circuit is true, which indicates the corresponding trunk is available for this call.

If one or more of the trunk circuits from a word is available the AND-gates 41P—45P select one of them, if the flip-flop TSC has been set. If any one of the signals TF1, TF3, TG1, TG3 or TH1 is true this indicates that the corresponding trunk has been preseized for a terminating call, and therefore these leads are connected to the respective ones of gates 41P—45P as inhibit inputs. The outputs of each of these gates is connected as an inhibit input to each of the succeeding ones so that if any one of the signals becomes true it inhibits all of the succeeding ones to thereby select only one trunk.

If during any search a "true idle" trunk is found as indicated by the signal BI13, that trunk is selected during the same operation cycle. This is accomplished by enabling the gates 35P—38P to provide a binary-coded-decimal value of 13, signals PRL1, PRL4 and PRL8 being true. Then all of the parity circuits 1P—5P for the trunks in a word which are "true idle" will become true. The signal BI13 via OR-gate 47P also enables gate 50P, since the signals TES and TNG are false at this time and the signal SCGN is true. The output of gate 50P in coincidence with the pulse B15X sets the flip-flop TSC. Then if the "true idle" trunk or trunks has not already been preseized for another call, there will be a signal on one of the leads SPA—SPE.

A trunk may also be selected during a second search if the signal PIP is true for preempt in process, or a "queueing idle" trunk has been found as indicated by the signal on lead MPL9 and the flip-flop RTG has been set to enable gate 46P, either of these signal conditions being used to enable gate 50P to set the flip-flop TSC. If during a second search the flip-flop PIP has been set to enable gate 49P it may be reset by the signal RPIP if one of the four inputs of OR-gate 48P is true. The first three inputs indicate that a "queueing idle" or "true idle" trunk is available, and the fourth input is the output of the unable to preempt flip-flop UPT.

Referring to FIG. 1B, gate 51P supplies a signal NES to indicate when a DPI9 word is read for a purpose which is not equipment selection. In general the equipment selection occurs during the translation instruction DT13, the code translation, and also during certain other translation instructions. However, the translation instructions DTI1, DTI2, DTI7, DTI8, and DTI9 involve being in the status section of the memory for other purposes, and are therefore supplied as input signals to gate 51P.

At the beginning of a sequence of operations in the translator and route selector a signal BRS from gate 53P is generated as a beginning reset of certain flip-flops. The first word of each section has a processing digit DPI16 and the identity of the section in position A, so that coincidence of the signals DA1 and DPI16 at gate 53P indicate the first word of the first section.

When starting a scan of a trunk group in the status section the group word is addressed, the coincidence of the signals DPI8 and the output of the comparison parity circuit TCG1—2 in FIG. 10 along with the output of flip-flop TAC enables gate 1013 to supply the coincidence signal CN5. If this is a line selection the routing-digit-indicator signal DRDI4 is true to enable gate 52P; and if the signals DRDI4 and DRDI5 are both false the gate 62P is enabled to supply a signal to flip-flop STN, the enabled one of these flip-flops being set in response to the pulse B14X.

The gates 54P—61P are used for preemption control during a line selection in accordance with the decoded value of the dialled priority digit and the value of the busy-idle indicator from gates 11P—14P. The signal GLP is the general-line preemption signal from the translator write circuits 121, and this signal in coincidence with the output of gate 61P via gate 64P supplies a DC input signal to the upper input of flip-flop PIP.

Preemption during trunk selection is controlled via gate 76P which is inhibited by a signal on either of the leads PIP or RTG being true, but is otherwise enabled in response to an output from OR-gate 75P. The output of gate 76P is supplied as a DC input to the second input of flip-flop PIP and also as a signal PIPE to the transfer buffer to reset the route sequence and route number counters to permit a new search of all of the trunk groups for the routing.

The first input of gate 75P is from AND-gate 71P which has inputs on lead DRDI2 indicating a route number type search, CN11 which via gate 1046 of FIG. 10 indicates coincidence of the route number in the route number section, and SPIPC which indicates a value of 15 for the route tens number to designate that this position is not used and therefore all route numbers have been searched. Gate 72P has an input CN9 which indicates coincidence in reading a word in the route sequence section, and the signal SPIPC which indicates a value of 15 for the route number signifying that all route numbers have been searched.

Gate 73P has inputs DPL10 which indicates that the end of a trunk group has been reached in the status section, TES inhibit to indicate that terminating equipment has not been selected, TB3, inhibit, and the output of gate 70P. The signal TB3 is true if this is the end of a subtrunk group. There are four inputs to gate 70P from gates 65P—68P respectively. Gate 65P has inputs DRDI2 indicating a route number type selection, and DRNC3 indicating that the route number counter has advanced to it maximum value. Gate 66P has inputs DRSC6 indicating that the sequence counter has advanced to its maximum value and DRNC3 indicating that the route number counter has advanced to its maximum value. Gate 67P has inputs STN for select-trunk-next type operation, and DTI8 which is a translation instruction for maintenance busy and retranslation loop around. Gate 68P has an inhibit on lead NES for a translation instruction which is not for equipment selection, and an input from gate 69P which is true in response to signal DRDI3 or DRDI5 indicating a trunk group or PABX group type selection respectively.

The last input of gate 75P is from gate 74P, which has inputs DRDI1 indicating a route sequence type selection, DRSC6 indicating that the route sequence counter has advanced to the last value, CN11 from gate 1046 which indicates a route number coincidence in the route number section during either a DRD11 or DRDI2 type of search, and SPIPC which indicates a value of 15 as a trunk group tens number in the route number section to designate that all trunk groups have been searched. The output of gate 74P is designated ICR for inhibit counter reset and is supplied to the transfer buffer circuits.

The flip-flop TES is set in response to the signal STKT from the translator write circuits 121, which becomes true whenever a line or trunk is selected.

The flip-flop UPT for unable to preempt is set in response to a signal from gate 87P, or a signal on lead UPL, in coincidence with the pulse signal on lead B5X. The signal UPL is from the translator write circuits 121 indicating an unable to preempt the line. Gate 87P has one input from a lead PIP indicating that the preempt in process flip-flop has already been set, and another input on lead MPL9 as an inhibit to prevent the setting of the unable to preempt flip-flop if a queueing idle trunk has become available. The last input of gate 87P is from OR-gate 86P whose principal input is from gate 85P. The signal PE is from the preempt flip-flop of the transfer buffer, FIG. 2A. The other input of gate 85P is from OR-gate 75P which is the preempt signal. Thus if a preempt search has been completed without finding an available trunk, and there is a repeated attempt to set the flip-flop PIP, the signal instead via gates 85P, 86P and 87P sets the unable to preempt flip-flop UPT. The second input of gate 86P is from gate 67P via lead SUPTE. The third input of gate 86P is from gate 84P having an inhibit input on lead SLN to indicate this is not a line selection, and another input from gate 83P. The various inputs to gate 83P from gates 77P—82P compare the dialled priority digit to the precedence found from the gate 31P—34P and also from the flip-flops MPL1—MPL9 to indicate one of the following conditions: precedence 1 call and lowest precedence on scan was 1, precedence 2 call and lowest precedence on scan was 2, precedence 3 call and lowest precedence on scan was 1, 2 or 3, lowest precedence on scan was 10, or a precedence 4 call.

The flip-flop RTG (reenter trunk group) is set when the end of a trunk group is reached as indicated by the DPI10 process instruction, if it is not the end of a subgroup by the inhibit on lead TB3, the terminating equipment had not been selected as indicated by an inhibit on lead TES, the flip-flop RTG has not already been set as indicated by an inhibit on lead RTG, and a queueing idle trunk has been found as indicated by the signal on lead MPL9. The flip-flop is reset in response to a signal on TES when the terminating equipment is selected.

The flip-flop TNG (try next trunk group) is set in response to the signal from gate 94P. The first input is an inhibit on lead NES if this is not an equipment selection type translation. The second input is from gate 73P for the types of preemption control designated by that gate, and the third input is from gate 94P. The first input of gate 93P is from gate 90P having one input on lead CN5 indicating coincidence on a DP18 group word in the status section, and an input from OR-gate 98P which has several inputs depending on the decoded value of the status digit as follows: DD2-group busy to all traffic, DD4-group busy to all outgoing traffic, DD5-group not preemptable, DD7-group available for priority traffic only on a terminating selection, or DD8-group available for routine traffic only on a terminating selection. The decoded dialled digit DDP4 (routine precedence) is supplied as an input to gate 96P for a routine preference call, and as an inhibit input to gate 97P to enable that gate when this is not a routine preference call.

The last input of gate 93P is from gate 92P which has a first input from OR-gate 95P indicating that this is a route sequence or route number type selection so that there are a plurality of trunk groups to be searched, an input DPI10 indicating the end of a trunk group in the status section, and inhibit inputs on leads TES to indicate the terminating equipment has not been selected, RTG to indicate that it is not a reenter trunk-group type operation, and TB3 indicating it is not the end of a subtrunk group.

The flip-flop TNG is reset each time the DPI8 word at the beginning of a trunk group is read, during interval B12X near the beginning of the operation cycle for translations.

TYPICAL OPERATION

A call is described in said Traffic Control application under the heading "General Operation of the System for a Typical Call" starting on page 7, and the heading "Detailed Operation for Code Operation" starting on page 38. For an understanding of the recording of the status of the lines and trunks in the status section of the memory, said Trunk Scanner application, and in particular Section D describing the translator write circuit 121, is also relevant, The operation is described in Section "D2. Translator Write Operation" starting on page 37 thereof.

In addition to the assumptions made by the call description in said Traffic Control application, assume that the calling digits received from the originating party include a priority digit having a decoded value DDP2 which designates a precedence level of "immediate." Note in said Trunk Scanner application description of the operation of the translator write circuits, under the subheading "Precedence Up-Grade Translation" that the priority digit is written into the status section of memory for the originating line or trunk.

In said Traffic Control application, at the beginning of the description of the detailed operation for code translation, the information loaded into the transfer buffer during the load cycle is described. In addition the priority digit is stored in block 811. The description may be followed in said Traffic Control application up to page 42 where the translator address is set to the DPI8 trunk group word. At this time the signal CN5 from gate 1013 is true. This signal is applied at gate 62P in FIG. 1B. It has been assumed that the routing digit indicator has a value DRD12, and the signal on lead NES is false. The output of gate 62P in coincidence with the pulse on lead B14X sets the flip-flop STN to control the "select trunk next" operation. The address advances by one to the first DPI9 word. The route selection control circuits 911 check the busy-idle status of the five trunks in each DPI9 word. Assume that in the first trunk group scanned that all trunks are busy at one of the three highest levels of priority. For example if in the first word for a set of five trunks the first and third are busy at the "immediate" precedence level, the signals DA2 and DC2 are true, which via gates 12P and 22P sets flip-flop MPL2. If the second and fifth trunks are busy at the "flash" precedence level, the signals DB1 and DE1 via gates 11P and 21P set the flip-flop MPL1. If the fourth trunk is busy at the "flash override" precedence the signal DD10 will appear; which is not used in FIG. 1A, since this level is not preemptable. The succeeding words of the trunk group are similarly scanned, and when the DPI10 word is reached at the end of the group the only ones of the MPL flip-flops which are set will be MPL1 and MPL2.

The translator again advances to the address of the DPI11 word. The section four start word address from bits F2—13 is entered in the address flip-flops of apparatus 902, and the flip-flop ETA is set to return to section 4 for the number of the next trunk group. The flip-flop ATA is set to advance through the route number section to again find coincidence with the route number of DP15 word. Since the route number counter has been advanced one step, the trunk group B from positions E and F is now selected and its identity transferred into the TG flip-flops of block 816. The route selection process now proceeds to section 6 as before to find the work having this new trunk group, and then transfers to the corresponding group address in section 7. In the first DPI9 word of the group, assume that the five trunks are busy at the "routine" precedence level, so that the signals DA4—DE4 via gates 14P and 24P set the flip-flop MPL4. Assume further that the remaining trunks of the group are busy at "routine," "immediate," or "flash" precedence levels, so that at the end of the scan of the entire trunk group when the DPI10 word is reached the flip-flops MPL1, MPL2, and MPL4 are in the set condition, while flip-flops MPL3 and MPL9 remain reset.

The section 4 start word address will again be obtained from the DPI11 word, and the route number section is entered to again find coincidence with the route number on a DP15 word. The route number counter is now advanced to read the trunk group C from positions G and H which is trunk group 31. This trunk group will then be scanned in the status section, and it is assumed that there are no idle trunks, and that at the end of the scan the flip-flops MPL3 and MPL9 are still in the reset condition. Upon reaching the DPI10 word at the end of the group, the route number counter will have been advanced so that the signal DRNC3 is true. This signal in coincidence with the signal on lead DRD12 enables gate 65P, and its output is applied via gate 70P to the input of gate 73P. Since this is not the end of a subtrunk group the signal on lead TB3 is false and the terminating equipment has not been selected so that the signal on lead TES is false. Therefore the signal on lead DPI10 enables gate 73P, with the output supplied via gates 73P and 76P to set the flip-flop PIP upon the occurrence of the pulse on lead B15X. The signal on lead PIPE from gate 76P is supplied to block 817 of the transfer buffer to reset the route number counter.

The operation for scanning the trunk groups of this route number is now repeated to search for a trunk which may be preempted. It has been assumed that the flip-flops MPL1, MPL2, and MPL4 are now set, with flip-flops MPL3 and MPL9 remaining reset, so that the signal on lead DPL4 from gate 34P is true. Therefore from gates 35P—38P, the signal on lead PRL4 is true while the signals on leads PRL1, PRL2 and PRL8 are false. These four signals are supplied to all of the five comparator parity circuits 1P—5P. When the flip-flop PIP became set the signal via gate 47P in coincidence with the signal SCGN enabled gate 50P to set the flip-flop TSC. As each word of the trunk group is scanned, the binary coded signals on the leads TA1,2,2,4—TE1,2,3,4 are supplied to the parity circuits 1P—5P to compare the priority level status stored therein to the priority level 4, which is the lowest priority of all of the trunks which may be used for this call. During the scan of the first trunk group, all of the trunks are still busy at one of the top three priority levels, so that the scan proceeds to the second trunk group as before.

In the first DPI9 word of the second group, which is trunk group 32, the route selection control circuit 911 finds that the trunk having the equipment number 3200 is busy at the "routine" priority level. This is the first trunk, whose status is stored in the first word for this group. Therefore at the parity circuit 1P the signal TA3 in coincidence with PRL4 true and T1, TA2, TA4 false in coincidence with PRL1, PRL2, PRL8 false enables the gate to supply the signal from its output to gate 41P. The signal TF1 for this trunk group is false, and the signal from flip-flop TSC is true so that gate 41P is enabled to generate the signal SPA. This signal is supplied to the status section write control circuits 121 shown in FIG. TS9. Since the signal TH3 is true for the first word, gate TS935A has a true output. The signal on lead TES is still false at this time, so that the signal from gate TS935A via gate TS937A enables gate TS940A. This supplies a signal to lead WTF1 to write the preseize bit of this trunk, and via gate TS943A supplies an input to gates TS951A—959A. The priority digit from the transfer buffer block 811 is supplied in binary code which for the "immediate" precedence level comprises the signals on DP1, DP4 and DP8 being false and the signal on DP2 being true. The output from gate TS941A via gate TS908 makes the signal STKT true, and this signal via gate TS905 supplies an input to the gates TS913—TS920, to thereby gate the priority digit to the OR-gates TS921—TS924 and thence to the gates TS951A—TS958A, and also to corresponding gates for the other trunks. The "immediate" precedence level is encoded as a signal on leads 1TA1, WTA2, ITA3, and ITA4. This value now becomes written into the memory.

In FIG. 1B the signal on lead STKT in coincidence with the pulse on lead B7X sets flip-flop TES. The flip-flop TSC in FIG. 1A is reset in each operation cycle by the pulse on lead B7X. The trunk tens number TKT from the memory, and the trunk units number TKU encoded on leads SU1—SU8 from the encoding circuit TS912, are supplied to block 816 to complete the identification of the selected trunk.

On the scan of succeeding DPI9 words of the group the signal on lead TES inhibits gate 50P so that flip-flop TSC cannot be set. The translator address continues to advance to the DPI10 word. This word contains the sending instructions which are transferred into block 805, and may also contain prefix digits P1—3 which if present are transferred into block 815. Also in FIG. 2A the preempt flip-flop PE was set in response to the setting of flip-flop PIP, and remains set.

The flip-flop CP is now set to terminate the translation and route selection process. The flip-flop DP is set, which causes the information from the transfer buffer to be dumped into the register junctor memory. This includes the preempt bit from flip-flop PE which is dumped into bit B1 of row 6, the terminating trunk identity being dumped into positions G—J of the same row.

The register sender via the date bus DB supplies the call information to the marker. This information includes a bit set in response to the preempt information from B1 of row 6. This information is used by the marker to preempt the trunk as described in said Precedence Trunk Circuit application.

We claim:

1. In a communication switching system in combination, switching apparatus, a group of communication paths connected to said switching apparatus, storage means individual to each of said paths to store the preference level of calls in progress over said paths, control means to select said group of paths, and means to select an individual one of said paths wherein a status circuit is provided and cooperates with said storage means to indicate a predetermined level of preference of calls in progress over the paths of said group, said means to select an individual one of said paths including control connections with said status circuit and with said storage means for joint control thereby; characterized in that said storage means comprises a common memory having a plurality of storage elements, with a set of storage elements individual to each of said paths to store the preference levels of calls in progress over the path;

wherein said control means to select a group of paths, said means to select an individual one of said paths, and said status circuit are part of a central processor interconnected to operate with said memory; with the interconnections including a read buffer connected to receive information signals from the sets of storage elements;

wherein said status circuit comprises a plurality of bistable devices and associated logic circuits, there being one of the bistable devices for each level of preference which may be preempted, the bistable devices each having input circuit means coupled via some of the logic circuits to the read buffer to set each bistable device in response to there being at least one path of a group in use at the corresponding preference level as stored in the memory;

and further including means to receive and store a priority digit designating an authorized level of preference for a call.

2. A communication system in accordance with claim 1 characterized in that said predetermined level of preference of calls indicated by said status circuit is the lowest level of preference of calls in progress over the paths of said group of paths.

3. A communication system in accordance with claim 1 characterized in that said means to select an individual one of said paths includes interconnections jointly controlled by said status circuit and by said storage means to mark for selection all the paths having calls in progress thereover of said predetermined preference level.

4. A communication system in accordance with claim 3 characterized in that said predetermined level of preference of calls indicated by said status circuit and marked for selection is the lowest level of preference of calls in progress over said group of paths.

5. A communication system in accordance with claim 1 characterized in that said means to select an individual one of said paths includes interconnections jointly controlled by said status circuit and by said storage means to mark for selection all of the paths having calls in progress thereover having a lower preference level than said predetermined preference level.

6. In a communication switching system, the combination as claimed in claim 1, wherein said means to select an individual one of said paths includes comparison means having one set of inputs coupled to the outputs of said status circuit bistable devices via some of said logic circuits, and another set of inputs coupled to said read buffer, to compare the status of each path with the lowest level of preference recorded in said status circuit.

7. In a communication switching system, the combination as claimed in claim 6, wherein the storage elements of said memory are organized into words, with each word comprising the status storage elements for a plurality of paths, the information from one word of the memory at a time being transferred into the read buffer;

wherein said comparison means comprises a number of comparison circuits equal to the number of paths having their status recorded in each word, each comparison circuit being connected to compare the status of one path of a word with the lowest level of preference recorded by said status circuit;

and wherein for each said group of paths there are a plurality of words of the memory, means to scan so that the information from these words is transferred in succession into the read buffer, each bistable device of the status circuit being set each time a word of information is transferred into the read buffer if there is a path in use at the corresponding preference level, so that upon the completion of a scan of a complete group of paths each bistable device will be set if there is at least one path in use at the corresponding preference level in the group.

8. In a communication switching system, the combination as claimed in claim 7, wherein said means to select an individual one of said paths includes an idle-detection circuit connected to said read buffer to detect the idle status for at least one path, said circuit being connected to the comparison circuits to indicate the presence of an idle circuit, so that the idle path is then selected.

9. In a communication switching system, the combination as claimed in claim 8 further including a preempt control bistable device which is connected to be set upon the completion of a scan of all paths of a group, and means to cause a repeated scan of the group to select a path in use at the lowest level of preference recorded in said status circuit as determined by said comparison circuits.

10. In a communication switching system, the combination as claimed in claim 9, further including an unable-to-preempt bistable device connected to be set at the end of the second scan if no path is available at a lower level of preference than that permitted for the call.

11. In a communication switching system, the combination as claimed in claim 10, wherein there are provided a plurality of groups of paths for use in a given routing to a destination, comprising a group for primary routing and at least one group for alternate routing, the selection circuits being arranged to scan all of the groups in succession on the first scan to search for an idle path and to set the bistable devices of the status circuit, and to set said preempt control bistable device at the end of the complete first scan, to thereby cause initiation of a second scan to search all of the groups to find a path available at the lowest level of preference recorded by the status circuit.

12. In a communication switching system, the combination as claimed in claim 11, further including means to select a specific individual path, means responsive to that path being at a busy status as recorded in the set of memory elements therefor to set said preempt control bistable device, and means responsive to the setting of the preempt control bistable device to preempt the line if its status is at a lower level of preference than the preference authorized for the call.

13. In a communication switching system, the combination as claimed in claim 1, wherein there are provided a plurality of groups of paths for use in a given routing to a destination, comprising a group for a primary routing and at least one group for alternate routing, the selection circuits being arranged to select and scan all of the groups in succession on a first scan to search for an idle path and to set the bistable devices of the status circuit.

14. In a communication switching system, the combination as claimed in claim 13, further including a preempt control bistable device which is connected to be set upon the completion of a scan of all of the paths of all of the groups, to thereby cause initiation of a second scan to search all of the groups to find a path available at the lowest level of preference recorded by the status circuit.

15. In a communication switching system, the combination as claimed in claim 14, further including an unable-to-preempt bistable device connected to be set at the end of the second scan if no path is available at a lower level of preference than that permitted for the call.

16. In a communication switching system, the combination as claimed in claim 1, wherein the status conditions which may be stored in the set of storage elements for a path include a "-true idle" and a "queueing idle" status, paths having a "true idle" status being selected in preference to those having a "queueing idle" status;

wherein one of the bistable devices of said status circuit is for "queueing idle," this being a lower level of preference than that designated by any of the other bistable devices for busy at some level of preference.

17. In a communication switching system, the combination as claimed in claim 16, wherein there are provided a plurality of groups of paths for use in a given routing to a destination, the selection circuits being arranged to scan all of the groups in succession on the first scan to search for a "true idle" path and to set the bistable devices of the status circuit, a reenter-trunk-group bistable device which is set in response to the setting of the queueing idle bistable device of the status circuit and no idle path having been selected to cause a repeated scan of that group to select a queueing idle path;

and alternatively means responsive to the queueing idle bistable device remaining in the reset condition and no idle path having been selected to cause the scan to proceed to other trunk groups in succession; and means responsive to completion of the first scan without selecting an idle path to proceed to a second scan to select a path from one of the groups at the lowest level of preference indicated by the status circuit.

18. In a communication switching system, the combination as claimed in claim 1, further including means responsive to the selection of an available path to record in the set of memory elements for that path the priority level authorized for the call.

19. In a communication switching system, the combination as claimed in claim 18, further including means to record the authorized priority level in the set of memory elements for the path from which a call has been originated.

20. In a communication switching system, the combination as claimed in claim 1, further including means to select a specific individual line, and means responsive to that line being busy to preempt it if the level of preference recorded in the set of memory elements therefor is lower than that authorized for the call.